United States Patent [19]

Nakajima et al.

[11] Patent Number: 5,120,619
[45] Date of Patent: Jun. 9, 1992

[54] X-RAY PHOSPHORS AND X-RAY INTENSIFYING SCREEN USING THE PHOSPHOR

[75] Inventors: Shigeharu Nakajima; Genichi Shinomiya; Mizuho Takeda; Satoru Chikutei, all of Anan, Japan

[73] Assignee: Nichia Kagaku Kogyo K.K., Tokushima, Japan

[21] Appl. No.: 609,062

[22] Filed: Nov. 7, 1990

Related U.S. Application Data

[63] Continuation of Ser. No. 368,954, Jun. 13, 1989, abandoned, which is a continuation of Ser. No. 931,066, Nov. 17, 1986, abandoned.

[30] Foreign Application Priority Data

Apr. 18, 1986 [JP] Japan ............ 61-90879

[51] Int. Cl.$^5$ .................... C09K 11/78
[52] U.S. Cl. .................... 428/690; 250/483.1; 252/301.4 R; 252/301.6 R
[58] Field of Search ........ 252/301.4 R, 301.6 R; 428/690; 250/483.1

[56] References Cited

U.S. PATENT DOCUMENTS

| | | | |
|---|---|---|---|
| 3,758,486 | 9/1973 | Ropp | 252/301.4 R |
| 4,225,653 | 9/1980 | Brixner | 252/301.4 R |
| 4,473,513 | 9/1984 | Cusano et al. | 252/301.4 R |

FOREIGN PATENT DOCUMENTS

| | | |
|---|---|---|
| 0011909 | 6/1980 | European Pat. Off. |
| 58-22063 | 5/1983 | Japan. |
| 899629 | 1/1982 | U.S.S.R. ............ 252/301.4 |

Primary Examiner—Jack Cooper
Attorney, Agent, or Firm—Wenderoth, Lind & Ponack

[57] ABSTRACT

This invention relates to rare earth tantalate and/or niobate phosphors which emit light under X-ray excitation, and an X-ray intensifing screen which utilizes these phosphors. The phosphor is represented by the general formula (I);

$$Ln_{1-x-(\frac{y}{2})y-(\frac{z}{2})z}M''_y M'_z DO_4 : xR^{3+} \qquad (I)$$

In this formula, M'' is at least one kind of divalent metal selected from the group consisting of Be, Mg, Ca, Sr, Zn and Cd, M' is at least one kind of alkali metal selected from the group consisting of Li, Na, Ba and K, Ln is at least one kind of element selected from the group consisting of Y, Gd, La and Lu, D consists of Ta and/or Nb, and R is at least one selected from the group conssiting of Tm, Pr, Sm, Eu, Tb, Dy and Yb, y is a value in the range $1 \times 10^{-5} \leq y \leq 1$, z is a value in range $1 \times 10^{-4} \leq z \leq 0.1$, and x is a numerical value in the range $0 \leq x \leq 0.05$.

The X-ray intensifying screen is composed of a supporting plane coated with the above mentioned phosphor. The phosphor is distributed on, and held in place by mixing with a binding agent.

11 Claims, 10 Drawing Sheets

X-RAY PHOSPHORS AND X-RAY INTENSIFYING SCREEN USING THE PHOSPHOR

This application is a continuation of now abandoned application Ser. No. 07/368,954 filed on June 13, 1989 which is a Continuation of abandoned Ser. No. 06/931m,066 filed on Nov. 17, 1986.

BACKGROUND OF THE INVENTION

The present invention relates to a phosphor which emits light under X ray excitation and an X-ray intensifying screen using the phosphor, which screen being especially used for medical and industrial radiography.

An X-ray excited phosphor is used mainly for X-ray intensifying screen. This X-ray intensifying screen is generally used in conjunction with photographic film for the purpose of improving the sensitivity of the photographic system in medical radiography. The phosphor used for such an X ray intensifying screen is required to have good X-ray absorption, a high X-ray to-light conversion efficiency, and a low afterglow noise.

An X-ray intensifying screen coated with phosphor of good X-ray absorption has higher definition of X-ray image and therefore can improve the diagnosis efficiency in the medical radiography. A phosphor having a high X-ray-to-light conversion efficiency can be used with only a little quantity of X-ray irradiation, and thereby, the exposure dose of the subject can be reduced. Further, a phosphor having a low quantity of afterglow component can prevent errors in consultation caused by residue (afterglow noise).

Recently, for the purpose of reducing the exposure dose of the subjects, X ray intensifying screens using a phosphor containing $Gd_2O_2S:Tb$, $BaFCl:Eu$, $LaOBr:Tm$, $YTaO_4:Tm$ or the like, instead of conventional phosphor of $CaWO_4$ have been put to practical use.

However, since $BaFCl:Eu$ and $LaOBr:Tm$ have low X-ray absorption dose, the definition of the obtained X-ray photograph is not good. Further, since the phosphor is shaped into flat granules, light emitted by the excitation of X-ray is much scattered and the sharpness of the X-ray image becomes low.

A phosphor containing $Gd_2O_2S:Tb$ emits light in the range from the blue zone to the green zone, and is used in combination with an orthochromatic film which is sensitive in the range from the blue zone to the green zone. Therefore, the film is easily exposed to light even in the darkroom and the darkroom lamp is required to be dim, which causes low workability.

Rare earth tantalate phosphors exhibit undesirable delayed fluorescence(afterglow), and afterglow noises occur when the phosphor screen is used in rapid succession for several films which limits its use. If a phosphor is developed which has a low afterglow noise and is provided with the advantages of rare earth tantalate phosphors, an ideal phosphor for X-ray use can be realized.

An important object of the present invention is to provide a a phosphor which can emit light by the excitation of X-ray, can absorb a large quantity of X-ray and has a high X-ray-to-light conversion efficiency and a low afterglow noise.

Further, another important object of the present invention is to provide an X-ray intensifying screen which affords to take a radiograph with only a small exposure dose of a subject and permits one to make a correct diagnosis of the subject.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF SUMMARY OF THE INVENTION

The inventors have studied in various ways the phosphor containing rare earth tantalate and/or rare earth niobate for the purpose of achieving the abovementioned object. As the result, we have succeeded in remarkably improving the afterglow characteristic of the phosphor by mixing a divalent metal and a n alkali metal to raw materials, before calcining. Further, the obtained phosphor containing the divalent metal and the alkali metal has not only a remarkably improved afterglow characteristic but can also show remarkably improved X-ray-to-light conversion efficiency.

The phosphor of the present invention is represented by the general formula(I);

$$Ln_{1-x-(\frac{3}{2})y-(\frac{1}{2})z}M''_yM'_zDO_4:xR^{3+} \qquad (I)$$

In this formula, $M''$ is at least one kind of divalent metal selected from the group consisting of Be, Mg, Ca, Sr, Zn and Cd, $M'$ is at least one kind of alkali metal selected from the group consisting of Li, Na, Ba and K, Ln is at least one kind of element selected from the group consisting of Y, Gd, La and Lu, D consists of Ta and/or Nb, and R is at least one selected from the group consisting of Tm, Pr, Sm, Eu, Tb, Dy and Yb.

If a large quantity of the divalent metal $M''$ is mixed in the raw materials during production, the afterglow characteristic can be improved, but an excessive content thereof causes to lower X-ray-to-light conversion efficiency.

The value y in the general formula indicating the content of the divalent metal $M''$ is determined as the desirable range $1 \times 10^{-5} \leq y \leq 1$ from the consideration of the afterglow characteristic and X-ray-to-light conversion efficiency. Further, the value of z in the general formula (I) indicating the content of the alkali metal $M'$ is determined as the desirable range $1 \times 10^{-4} \leq z \leq 0.1$ from the consideration of afterglow characteristic and X-ray-to-light conversion effeciency. Furthermore, an excessive quantity of the activator Tm, Pr, Sm, Eu, Tb, Dy or Yb causes to lower the light emission efficiency. However, the phosphor according to the present invention can be used without any activator since the matrix itself can emit light. The value of x in the general formula (I) indicating the content of the activator is determined as $0 \leq x \leq 0.05$ from the consideration of the light emission efficiency.

In the X-ray intensifying screen according to the present invention, the phosphor represented by the abovementioned general formula (I) is adhered in the dispersed state onto a support by means of a binding agent.

DETAILED DESCRIPTION

The present invention relates to X-ray phosphors and an X-ray intensifying screen using the phosphor. Therefore, there will be described the method for producing an X-ray intensifying screen using the phosphor according to the present invention and the method for producing the phosphor.

The X-ray intensifying screen mainly comprises a support and a phosphor layer provided on the support, the phosphor layer comprising a binding agent carrying the phosphor, thephosphor, represented by the general formula (I);

$$Ln_{1-x-(\frac{y}{2})y-(\frac{z}{2})z}M''_yM'_zDO_4:xR^{3+} \qquad (I)$$

In this formula, M" is at least one kind of divalent metal selected from the group consisting of Be, Mg, Ca, Sr, Ba, Zn and Cd, M' is at least one kind of alkali metal selected from the group consisting of Li, Na, and K, Ln is at least one kind of element selected from the group consisting of Y, Gd, La and Lu, D consists of Ta and/or Nb, and R is at least one selected from the group consisting of Tm, Pr, Sm, Eu, Tb, Dy and Yb, y is a value in the range $1 \times 10^{-5} \leq y \leq 1$, z is a value in range $1 \times 10^{-4} \leq z \leq 0.1$, and x is a numerical value in the range $0 \leq x \leq 0.05$.

The phosphor layer is formed on the support in the following way as well known.

Firstly, the phosphor and an binding agent are added to a solvent and mixed together to prepare a coating liquid in which particles of the phosphor are uniformly dispersed in the binding agent solution. As the binding agent for the phosphor layer, nitrocellulose, polyalkyl(metha) acrylate, linear polyester and their mixture can be used.

As the solvent for preparing the coating liquid, esters of lower fatty acids and lower alcohols such as ethyl acetate, butyl acetate, ketones such as acetone and methyl ethyl ketone, ethers such as dioxane and ethylene glycol monoethyl ether and their mixtures can be used.

The mixture ratio of the binding agent and the phosphor in the coating liquid is varied in accordance w ith the characteristic of the X-ray intensifying screen to be obtained or the particle size of the phosphor, but it is preferably selected in the range from 1:8 to 1:40(weight ratio).

Further, additive agents may be mixed into the coating liquid, such as a dispersing agent for improving the dispersiblity of the phosphor particles and a plasticizer for improving the binding force between the binding agent and the phosphor particles.

The coating is formed by uniformly coating the coating liquid prepared as above-mentioned on the support with a conventional coating member such as a doctor blade, a roll coater, a knife coater or the like.

After the coating is formed, the coating is dried whereby the formation of the phosphor layer on the support is completed. The thickness of the phosphor layer is varied with the characteristics of the intensifying screen to be obtained, the particle size of the phosphor and the mixture ratio of the binding agent and the phosphor, but it is preferably selected usually in the range from 70μm to 700μm.

The phosphor layer may comprise one layer or more than two layers. When more than two layers are laminated, at least one layer of them contains the phosphor represented by the general formula (I).

The material for making the support may be selected from many kind of conventional materials for the support of the X-ray intensifying screen. Such examples are plastic films of cellulose acetate, polyester, polyamide, polycarbonate, metal sheets of aluminum foil or aluminum alloy foil, or pigment papers containing titanium dioxide or the like.

When plastic films are used, a light absorptive material such as carbon black, or a light reflective material such as titanic dioxide may be blended thereinto. The former is suitable for an X-ray intensifying screen of a high sharpness type while the latter is suitable for an X-ray intensifying screen of a high sensitivity.

Usually in an X-ray intensifying screen, a transparent protective film for physically and chemically protecting the phosphor layer is provided on the surface of the phosphor layer opposite to the contact surface with the support. Preferably, such a transparent protective film is provided in an X-ray intensifying screen using the phosphor according to the present invention.

The transparent protective film can be formed by dissolving a cellulose derivative such as cellulose acetate or nitrocellulose, or a transparent polymeric substance such as polymetyl methacrylate, polycarbonate or polyvinyl acetate into a suitable solvent to prepare a solution, and coating the solution on the surface of the phosphor layer. Otherwise, the transparent protective film can be formed by adhering a transparent thin film separately made of polyethylene, polyethylene terephthalate or polyamide onto the surface of the phosphor layer with an adhesive agent.

Now, examples of methods for producing proposed phosphors will be described in the following. However, these examples will not limit the present invention.

EXAMPLE 1

112.3 g of yttrium oxide and 0.981 g of thulium oxide were dissolved in 340ml of lON hydrochloric acid. Pure water was added thereto to make 1000ml of a solution. Then,the solution was heated to 80 degrees C. with mixing. On the other hand, a water solution of oxalic acid obtained by dissolving 220 g of oxalic acid into 1000 ml of pure water was heated to 80 degrees C. and added to the abovementioned 80 degrees C hydrochloric acid solution with mixing. Thus, in the solution, oxalate of yttrium and thulium was produced and precipitated together. The solution containing the precipitate was cooled in the air and then washed five times with water by decantation, and the precipitate was sucked and filtered. The precipitate was decomposed by heating at a temperature of 850 degrees C for 3 hours, whereby 113.2 g of oxide was obtained. Then 63.0 g of thus obtained oxide, 125 g of tantalic pentaoxide and 21 g of calcium chloride were well mixed and put in an alumina crucible and then calcined at a temperature of 1000 degrees C for 15 hours. The calcinated substance was mixed with 62.5 g of lithium chloride and 0.4 g of boric acid and ground and blended together by a ball mill. Then, the obtained mixture was put into an almina crucible, calcinated at a temperature of 1200 degrees C for 10 hours, ground by a ball mill, washed with pure water five times by decantation and filtered by suction. Further, the obtained substance is dried at a temperature of 120 degrees C for 15 hours. The obtained phosphor was confirmed to be reprensented by such a constituent formula as $Y_{0.9783}Ca_{0.01}Li_{0.03}TaO_4:0.005Tm^{3+}$.

Figure 1:
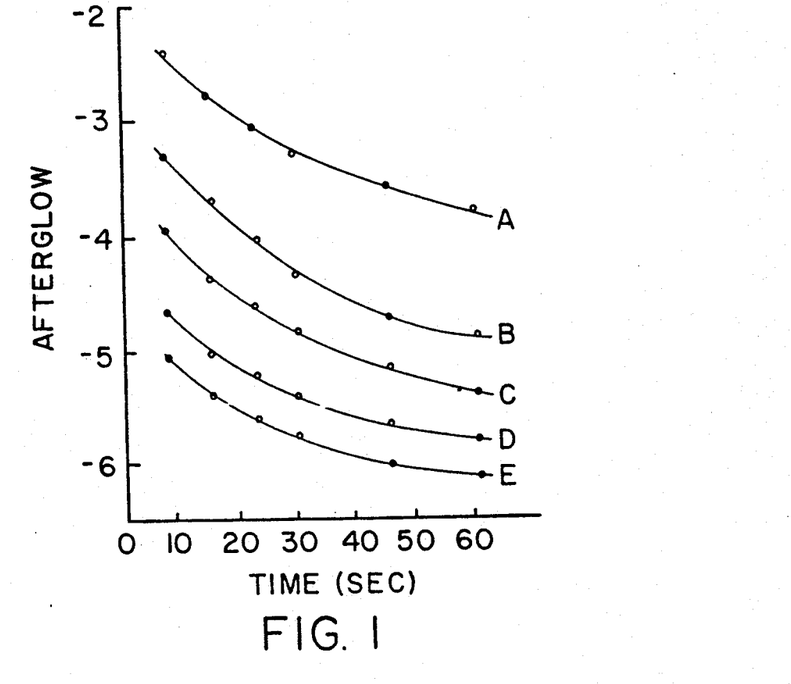
FIGS. 1 to 8 are graphs showing the afterglow characteristic and relative brightness of the phosphor which emits light by the excitation of X-rays.

As shown by the curve D in FIG. 1, the obtained phosphor showed much lower afterglow characteristic than the conventional phosphor containing no calcium and lithium (shown by the curve A).

Figure 2:
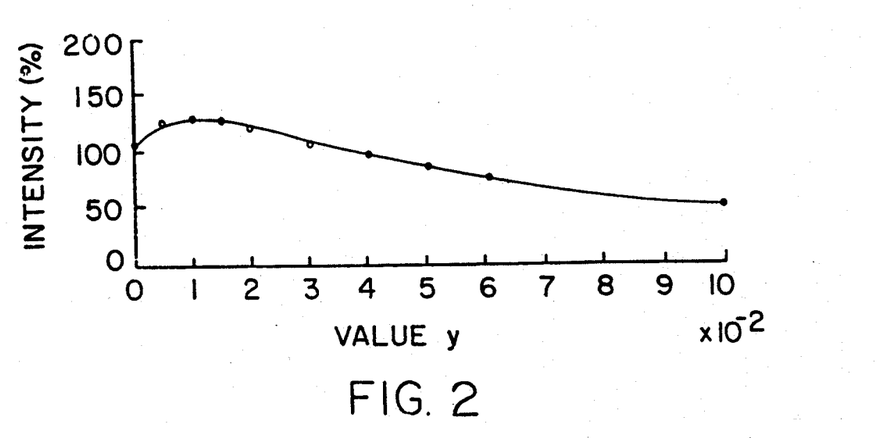

Further, as shown in FIG.2, the relative brightness intensity of luminescence of the obtained phosphor was improved than conventional phosphor no mixed calcium and lithium to base material.

Then, using this phosphor, an X-ray intensifying screen was manufactured as described in the following. The phosphor particles were mixed with a linear polyester resin. To this mixture, metyl ethyl ketone and then nitrocellulose of a nitration degree of 11.5% were added, whereby the dispersed solution of the phosphor was prepared Diethyl phthalate, phthalic acid and metyl ethyl ketone were added to the dispersed solution, and sufficiently stirred and mixed by a homogenizer whereby a coating liquid was prepared of which the mixture ratio of the binding agent and the phosphor was 1:20(weight ratio), and the viscosity was 30PS(25 degrees C).

A polyester sheet (support, 200 μm thick), previously coated with titanic dioxide, was uniformrly coated with the coating liquid using a doctor blade. The polyester sheet was laid horizontally on a glass plate for further support. After the coating was formed on the support, it is dried in a drier whereby a phosphor layer having a thickness of 180 μm was formed.

Then, a transparent polyethylene film is adhered onto the surface of the phosphor layer with a polyester adhesive agent to form a transparent protective film(10 μm thick), so that an X-ray intensifying screen was manufactured.

The sensitivity of this X-ray intensifying screen was improved in comparison with that of a conventional X-ray intensifying screen containing no calcium and lithium, and the exposure of the film to light caused by the afterglow was also remarkably reduced.

EXAMPLE 2

The phosphor was prepared using 62.1 g of yttrium oxide, 0.546 g of thulium oxide, 125 g of tantalic pentoxide, 29 g of strontium chloride, and 62.5 g of lithium chloride in the same method as employed in Example 1. As a result, the phosphor represented by the constituent form ula $Y_{0.9717}Sr_{0.02}Li_{0.03}TaO_4:0.005Tm^{3+}$.

This phosphor (FIG. 3, the curve E) has a remarkably smaller afterglow component that of the conventional phosphor (FIG. 3, the curve A) containing no strontium and lithium. Further, the relative brightness was improved by 86% in comparison with the control containing no strontium and lithium.(FIG. 4)

Using this phosphor, an X-ray intensifying screen was manufactured in the same way as described in Example 1. It was confirmed that the sensitivity of the X-ray intensifying screen was improved nearly by 86% in comparison with the control containing no strontium, and the afterglow characteristic was also remarkably excellent.

EXAMPLE 3

The phosphor was prepared in the same method as employed in Example 1, except using 60.6 g of yttrium oxide, 0.218 g of thurium oxide, 125 g of tantalic pentoxide, 1.1 g of magnesium chloride and 62.5 g of lithium chloride. As A result, the phosphor represented by the constituent formula $Y_{0.948}Mg_{0.06}Li_{0.03}TaO_4:0.002Tm^{3+}$.

The relative brightness and the relative afterglow quantity of this phosphor were measured in comparison with the conventional phosphor containing no magnesium and lithium (represented by the constituent formula $Y_{0.998}TaO_4:0.002Tm^{3+}$) and the results are shown in Table 1.

In Table 1, the relative afterglow quantity is represented by Log 10 [afterglow quantity after 30 seconds / light emission quantity].

EXAMPLE 4

Using 63.1 g of yttrium oxide, 0.218 g of thulium oxide, 125 g of tantalic pentoxide, 17 g of barium chloride and 9.92 g of sodium chloride, the phosphor was prepared in the same method as employed in Example 1. As a result, the phosphor represented by the constituent formula $Y_{0.98733}Ba_{0.001}Na_{0.03}TaO_4:0.002Tm^{3+}$ was obtained.

The relative brightness and the relative afterglow quantity of the phosphor were measured in comparison with the conventional phosphor 4 containing no barium and sodium (represented by the constituent formula $Y_{0.998}TaO_4:0.002Tm^{3+}$), and the results are shown in table 1.

EXAMPLE 5

Using 100.9 g of gadolinium oxide, 0.327 g of thulium oxide, 125 g of tantalic pentoxide, 0.71 g of beryllium oxide and 12.7 g of potassium chloride, the phosphor was prepared in the same method as employed in Example 1. As a result, the phosphor represented by the constituent formula $Gd_{0.9837}Be_{0.005}K_{0.03}TaO_4:0.003Tm^{3+}$ was obtained. The relative brightness and the relative afterglow quantity of the phosphor were measured in comparison with the conventional phosphor 5 containing no beryllium and potassium (represented by the constituent formula $Gd_{0.997}TaO_4:0.003Tm^{3+}$), and the results are shown in Table 1.

EXAMPLE 6

Using 31.2 g of yttrium oxide, 50.2 g of gadolinium oxide, 0.546 g of thulium oxide, 125 g of tantalic pentoxide, 0.71 g of zinc carbonate and 62.5 g of lithium chloride, the phosphor was prepared in the same way as employed in Example 1. As a result, the phosphor represented by the constituent formula $Y_{0.48917}Gd_{0.48917}Zn_{0.01}Li_{0.03}TaO_4:0.005Tm^{3+}$ was obtained. The relative brightness and the relative afterglow quantity of the phosphor were measured in comparison with the conventional phosphor 6 containing no zinc and lithium (represnted by the constituent formula $Y_{0.4975}Gd0.4975TaO_4:0.005Tm^{3+}$), and the results are shown in Table 1.

EXAMPLE 7

Using 31.2 g of yttrium oxide, 45.1 g of lanthan oxide, 0.546 g of thulium oxide, 125 g of tantalic pentoxide, 0.98 g of cadmium carbonate and 62.5 g of lithium chloride, the phosphor was prepared in the same way as employed in Example 1. As a result, the phosphor represented by the constituent formula $Y_{0.48917}La_{0.48917}Cd_{0.01}Li_{0.03}TaO_4:0.005Tm^{3+}$ was obtained. The relative brightness and the relative afterglow quantity of the phosphor were measured in comparison with the conventional phosphor 7 containing no cadmium and lithium (represented by the constituent formula $Y_{0.4975}La_{0.4975}TaO_4:0.005Tm^{3+}$), and the results are shown in Table 1.

EXAMPLE 8

Using 62.8 g of yttrium oxide, 0.546 g of thulium oxide, 124.4 g of tantalic pentoxide, 0.376 g of niobic pentoxide, and 29 g of strontium chloride and 62.5 g of lithium chloride, the phosphor was prepared in the same way as employed in Example 1. As a result, the phosphor represented by the constituent formula $Y_{0.9837}Sr_{0.002}Li_{0.03}Ta_{0.995}Nb_{0.005}O_4: 0.005Tm^{3+}$ was obtained. The relative brightness and the relative afterglow quantity of the phosphor were measured in comparison with the conventional phosphor containing no strontium and lithiu m (rep resented by the constitu ent form ula $Y_{0.995}Ta_{0.995}Nb_{0.005}O_4: 0.005Tm^{3+}$), and the results are shown in Table 1.

EXAMPLE 9

106.13 g of yttrium oxide, 11.07 g of strontium carbonate, 220.95 g of tantalic pentoxide were mixed with 25 g of lithium chloride and ground and blended together by a ball mill.

Then the obtained mixture was put in an alumina crucible and then calcined at a temperature of 1200 degrees C for 10 hours. The calcinated substance was ground by a ball mill, washed with pure water five times by decantation and filtered by suction. Further the obtained substance was dried at a temperature of 120 degrees C for 15 hours. The obtained substance was confirmed to be represented by the general formula $Y_{0.940}Sr_{0.075}Li_{0.03}TaO_4$. As shown in Table 2, this phosphor showed much lower afterglow quantity than the conventional phosphor 9 containing no strontium and lithium ($YTaO_4$) and the relative brightness thereof were improved in comparison with the conventional phosphor 9.

Then, using this phosphor, a X-ray intensifying screen was manufactured in the same method as employed in Example 1. The sensitivity of this X-ray intensifying screen was improved by 32% in comparison with that of a conventional X-ray intensifying screen containing no strontium and lithium, and the film was slightly exposed by the afterglow.(Table 2)

EXAMPLE 10

Using 106.13 g of yttrium oxide, 7.51 g of calcium carbonate, 220.95 g of tantalic pentoxide and 25 g of lithium chloride, the phosphor was prepared in the same method as employed in Example 9. As a result, the phosphor represented by the constituent formula $Y_{0.940}Ca_{0.075}Li_{0.03}TaO_4$ was obtained. As shown in Table 9, the afterglow component of the phosphor was remarkably lower than that of the conventional phosphor containing no calcium and lithium. Further, the relative brightness of this phosphor was improved by 26% in comparison with the conventional phosphor containing no calcium and lithium.(Table 2) When this phosphor was used for producing an X-ray intensifying screen, the sensitivity thereof was improved by 24% in comparison with that of the conventional phosphor 9 containing no calcium and lithium, and the afterglow characteristic was also remarkably excellent.

EXAMPLE 11

Using 109.52 g of yttrium oxide, 5.92 g of barium carbonate, 220.95 g of tantalic pentoxide and 25 g of lithium chloride, the phosphor was prepared in the same method as employed in Example 9. As a result, the phosphor represented by the constituent formula $YO_{0.97}Ba_{0.03}Li_{0.03}TaO_4$ was obtained. The relative brightness of this phosphor was improved by 53% in comparison with the conventional phosphor 9 containing no barium and lithium and the relative afterglow quantity was reduced nearly to ⅓ of that of the latter.(Table 2) Further, when this phosphor was used for producing an X-ray intensifying screen, the sensitivity thereof was improved by 43% in comparison with the conventional phosphor 9.(Table 2)

EXAMPLE 12

Using 109.52 of yttrium oxide, 2.53 g of magnesium carbonate, 220.95 g of tantalic pentoxide and 25 g of lithium chloride, the phosphor was prepared in the same method as used in Example 9. As a result, the phosphor represented by the constituent formula $Y_{0.97}Mg_{0.03}Li_{0.03}TaO_4$ was obtained. The relative brightness and the relative afterglow quantity of the phosphor were measured in comparison with those of the conventional phosphor 9 containing no magnesium and lithium, the results are shown in Table 2.

Further, the sensitivity of an X-ray intensifying screen in which the phosphor was used was improved by 25% in comparison with the conventional phosphor 9 containing no magnesium and lithium.(Table 2)

EXAMPLE 13

Using 100.49 g of yttrium oxide, 25.86 g of cadmium carbonate, 220.95 g of tantalic pentoxide and 25 g of lithium chloride, the phosphor was prepared in the same method as employed in Example 9. As a result, the phosphor represented by the constituent formula $Y_{0.89}Cd_{0.15}Li_{0.03}TaO_4$ was obtained. The relative brightness of this phosphor was improved by 47% and the relative afterglow quantity was reduced to 1/360 in comparison with the conventional phosphor 9. When this phosphor was used for producing an X-ray intensifying screen, the sensitivity was improved by 44% in comparison with the conventional phosphor 9.(Table 2)

EXAMPLE 14

Using 109.52 g of yttrium oxide, 3.76 g of zinc carbonate, 220.95 g of tantalic pentoxide and 25 g of lithium chloride, a phosphor was prepared in the same method as employed in Example 9 As a result, the phosphor represented by the constituent formula $Y_{0.97}Zn_{0.03}Li_{0.03}TaO_4$ was obtained. The relative brightness and the afterglow quantity of the phosphor were measured in comparison with the conventional phosphor 9 containing no zinc and lithium and the results were shown in Table 2.

When this phosphor was used for producing an X-ray intensifying screen, the sensitivity was improved by 30% in comparison with the conventional phosphor 9.(Table 2)

EXAMPLE 15

108.95 g of yttrium oxide and 0.96 g of thulium oxide were dissolved into 340 ml of 10N hidrochloric acid in the ionic state. Pure water was added to make the solution 1000 ml. Then the solution was heated to 80 degrees C with stirring. On the other hand, 220 g of oxalic acid was dissolved in 1000 ml of pure water and this aqueous solution of oxalic acid was heated to a temperature of 80 degrees C and then added with stirring to the abovementioned hydrochloric acid solution heated to 80 degrees C. Thus, in the mixed solution, oxalates of yttrium and thulium were produced and precipitated together.

After this solution containing the precipitate was cooled in the air, it was washed five times with pure water by decantation, and the precipitate was filtered by suction. The precipitate was heat-decomposed at a temperature of 850 degrees C for 3 hours to obtain the oxide of oxalate.

Using 109.91 g of thus obtained oxide, 0.75 g of beryllium oxide, 219.85 g of tantalic pentoxide, 0.66 g of niobium pentoxide and 25 g of lithium chloride, a phosphor was prepared in the same method as employed in Example 9. As a result, the phosphor represented by the constituent form ula $Y_{0.965}Be_{0.03}Li_{0.03}Ta_{0.995}Nb_{0.005}O_4:0.005Tm^{3+}$ was obtained.

The relative brightness and the relative afterglow quantity of the phosphor were measured in comparison with the conventional phosphor 10 containing no beryllium, niobium and lithium and the results were shown in Table 2.

EXAMPLE 16

Using 108.95 g of yttrium oxide, 0.96 g of thulium oxide, 4.43 g of strontium carbonate, 220.95 g of tantalic pentoxide and 25 g of lithium chloride, a phosphor was prepared in the same method as employed in Example 15. As a result, the phosphor represented by the constituent formula $Y_{0.965}Sr_{0.030}Li_{0.030}TaO_4:0.005Tm^{3+}$ was obtained. The relative brightness and the relative afterglow quantity of the phosphor were measured in comparison with the conventional phosphor 10 containing no strontium and lithium and the results were shown in Table 2.

EXAMPLE 17

Using 49.96 g of yttrium oxide, 80.20 g of gadolinium oxide, 0.96 g of thulium oxide, 29.60 g of barium carbonate, 220.95 g of tantalic pentoxide and 25 g of lithium chloride, a phosphor was prepared in the same method as employed in Example 15. As a result, the phosphor represented by the constituent formula $Y_{0.4425}Gd_{0.4425}Ba_{0.1500}Li_{0.0300}TaO_4:0.005Tm^{3+}$ was obtained.

The relative brightness and the relative afterglow quantity were measured in comparison with those of the conventional phosphor 11 containing no barium and lithium. And the results were shown in Table 2.

EXAMPLE 18

Using 44.32 g of yttrium oxide, 63.94 g of lantan oxide, 0.96 g of thulium oxide, 51.72 g of cadmium carbonate, 220.95 g of tantalic pentoxide and 25 g of lithium chloride, a phosphor was prepared in the same method as employed in Example 15. As a result, the phosphor represented by the constituent formula $Y_{0.3925}La_{0.3925}Cd_{0.3000}Li_{0.0300}TaO_4:0.005Tm^{3+}$ was obtained.

The relative brightness and the relative afterglow quantity were measured in comparison with the conventional phosphor 12 containing no cadmium and lithium, and the results are shown in Table 2.

In Table 2, the relative afterglow quantity is represented by $Log_{10}$ [afterglow quantity after 30 seconds / light emission quantity]. In the abovementioned general formula (I) of the phosphor according to the present invention, Ln can comprise Lu instead of Y, Gd or La used in Examples 1 to 18.

The phosphor according to the present invention can be used without containing any activator since the matrix itself can emit light as shown in Examples 9 to 14.

Further, in the phosphor according to the present invention the matrix of which can emit light, Ce, Pr, Nd, Sm, Eu, Tb, Dy, Yb or the like can be used as an activator in addition to or instead of Tm.

The phosphor of the present invention which is represented by the abovementioned general formula (I) can show an excellent X-ray absorption characteristic and a remarkably improved afterglow characteristic. Further, by controlling the content of each element in the predetermined range, the phosphor can emit light of higher brightness than the conventional phosphor does.

By an X-ray intensifying screen in which the phosphor represented by the general formula (I) is used, images of high quantity and free from afterglow noises can be obtained consistently and the sensitivity of the X-ray image can be improved, and besides, the exposure dose of the subject can be reduced. These will be now described with reference to the appended drawing.

In FIG. 1, the ordinate indicates the relative afterglow quantity (the logarithmic value of [light emission quantity after a lapse of time / light emission quantity at the time of X-ray excitation]), while the abscissa indicates the decay time of the afterglow (the lapse of time from stopping the X-ray radiation).

In FIG.1, the curve C indicates the afterglow characteristic of the phosphor when in the general formula (I)

$$Ln_{1-x-(\frac{2}{3})y-(\frac{1}{3})z}M''_yM'_zDO_4:xR^{3+} \qquad (I)$$

M" is Ca, M' being Li, Ln being Y, R being Tm, D being Ta, x=%0.005, y=1×10⁻⁴ and z=0.03, that is, the phosphor $Y_{0.98493}Ca_{0.0001}Li_{0.03}TaO_4:0.005Tm^{3+}$. For the purpose of comparison, the afterglow characteristic of the conventional phosphor when y=0, z=0, that is, the phosphor $Y_{0.995}TaO_4:0.005Tm^{3+}$ is represented by the curve A.

It is shown in FIG. 1 (the curve C) that the phosphor according to the present invention in which y=1×10⁻⁴, z=0.03 has a remarkably excellent afterglow characteristic in comparison with the conventional phosphor (the curve A) in which y=0, Z=0. Further in FIG. 1, the afterglow characteristics of the phosphors are shown when in the abovementioned general formula (I)

$$Ln_{1-x-(\frac{2}{3})y-(\frac{1}{3})z}M''_yM'_zDO_4:xR^{3+},$$

M" is Ca, M' being Li, Ln being Y, R being Tm, D being Ta, x=0.005, z=0.03, y=1×10⁻⁵, y=1×10⁻¹ and y=1×10⁻¹. That is, the afterglow characteristics of the phosphors $Y_{0.984993}Ca_{0.00001}Li_{0.0300}TaO_4:0.005Tm^{3+}$, $Y_{0.9783}Ca_{0.01}Li_{0.03}TaO_4:0.005Tm^{3+}$ (phosphor obtained in Example 1) and $Y_{0.918}Ca_{0.1}Li_{0.0}$ $3TaO_4:0.005Tm^{3+}$ are indicated by the curves B, D and E in this order.

It is apparent from FIG. 1 that the phosphors according to the present invention is which $z=0.03$, $y=1\times10^{-2}$ and $y=1\times10^{-1}$ have especially more excellent afterglow characteristics than the conventional phosphor in which $y=0$, $z=0$.

Now, taking the case of the phosphor $Y_{0.985(-\frac{3}{5})y}Ca_yLi_{0.03}TaO_4:0.005Tm^{3+}$ according to the present invention, the influence of the calcium content upon the light emission characteristic will be described with reference to FIG. 2. In FIG. 2, the ordinate indicates the brightness (relative value) of the light emitted by the X-ray excitation while the abscissa indicates the calcium content y of the phosphor.

According to FIG. 2, the light emission efficiency was remarkably improved when $0.2\times10^{-2}\leq y\leq 3\times10^{-2}$ in the abovementioned constituent formula and the brightness then was improved in comparison with the phosphor in which $y=0$, $z=0$.

Then, taking of the case of the phosphor $Y_{0.985(-\frac{3}{5})y}Sr_yLi_{0.03}TaO_4:0.005Tm^{3+}$ according to the present invention, the influence of the strontium content upon the afterglow characteristic and the light emission characteristic will be described with reference to FIGS. 3 and 4.

Figure 3:
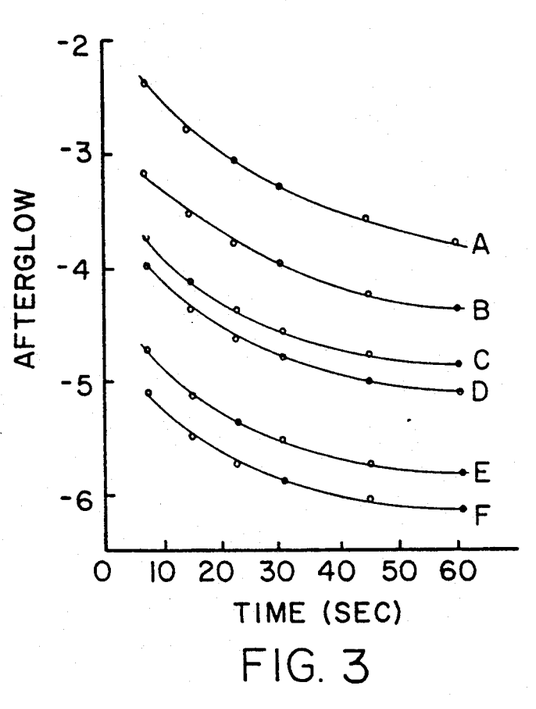
Figure 4:
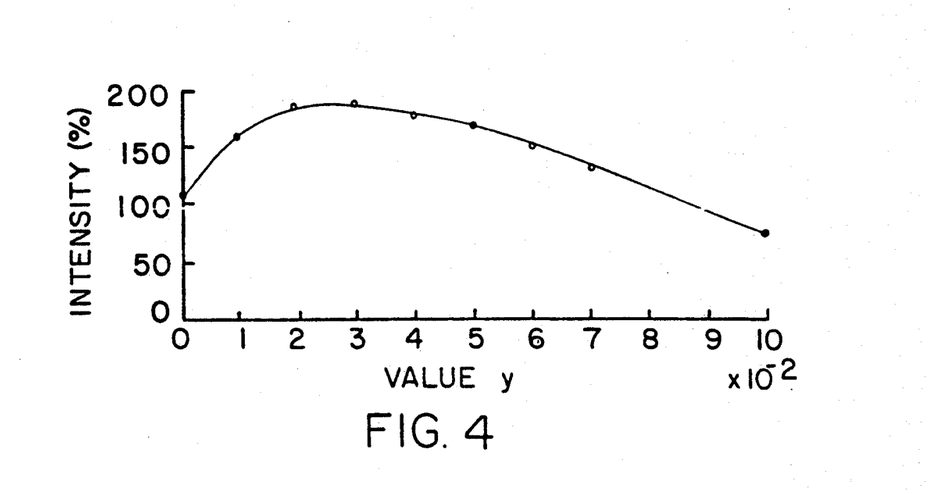

FIG. 3 shows the influence of the strontium content (the value y) of the phosphor $Y_{0.985-(\frac{3}{5})y}Sr_yLi_{0.03}TaO_4:0.005Tm^{3+}$ upon the afterglow characteristic. In this figure, the curves A, B, C, D, E or F indicate the afterglow characteristics of the phosphors according to the present invention in which in the abovementioned general formula $y=0$, $y=1\times10^{-5}$, $y=5\times10^{-5}$, $y=1\times10^4$, $y=2\times10^{-5}$, (obtained in Example 2) and $y=1\times10^{-5}$ in this order.

It is apparent from this figure that when the value y was above $1\times10^{-5}$, the afterglow characteristic was remarkably improved.

Further, as apparent from the light emission characteristics shown in FIG.4, the relative brightness of the abovementioned phosphor $Y_{0.985-(\frac{3}{5})y}Sr_yLi_{0.03}TaO_4:0.005Tm^{3+}$ was remarkably improved when the strontium content y was above $0.5\times10^{-2}$, and when $0.5\times10^{-2}\leq y\leq 6\times10^{-2}$ the relative brightness was improved by 50% to 86% in comparison with the phosphor in which $y=0$, that is, having no strontium content.

FIGS. 5 to 8 show the afterglow characteristics of the phosphors obtained in Examples 9 to 11 and 13.

Figure 5:
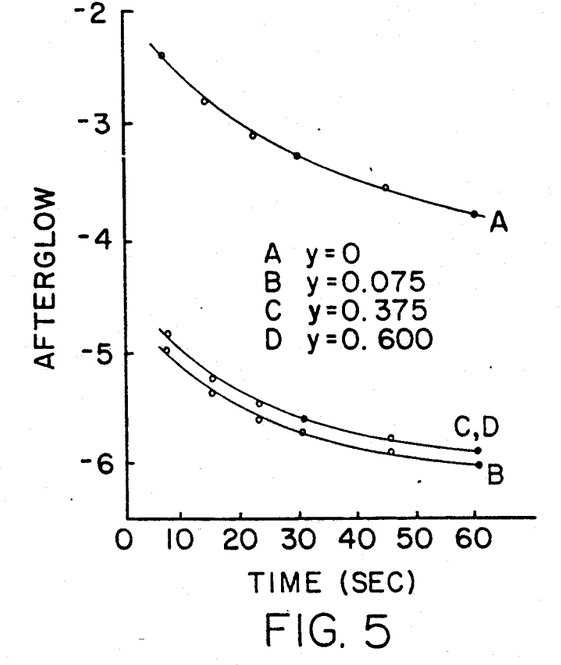

In FIG. 5, the curve B indicates the afterglow characteristic of the phosphor $Ln_{1-x-(\frac{3}{5})y-(\frac{1}{3})z}M''_yM'_zDO_4:xR^{3+}$ in which M'' is Sr, M' being Li, Ln being Y, D being Ta, $x=0$, $y=0.075$ and $z=0.03$, that is the phosphor $Y_{0.940}Sr_{0.075}Li_{0.03}TaO_4$. For the purpose of comparison, the curve A indicates the afterglow characteristics of the conventional phosphor in which $y=0$, $z=0$, that is, the phosphor $YTaO_4$.

In FIG. 5, the ordinate indicates the relative afterglow quantity ($\log_{10}$ [light emission quantity after a predetermined time / light emission quantity at the time of X-ray excitation]) while the abscissa indicates the decay time of the afterglow (the lapse of time after stopping the X-ray radiation).

It is apparent from FIG. 5 that the phosphor obtained in Example 9 in which $y=0.075$ (the curve B) has a much more excellent afterglow characteristic than the conventional phosphor (the curve A) in which $y=0$, $z=0$. Further, in FIG. 5, the curves C and D indicate the afterglow characteristics of the phosphors in the abovementioned general formula (I) $Ln_{1-x-(\frac{3}{5})y-(\frac{1}{3})z}M''_yM'DO_4:xR^{3+}$, M'' is Sr, M' being Li, Ln being Y, D being Ta, $x=0$, $z=0.03$ and $y=0.375$ and $y=0.600$, that is, the phosphors $Y_{0.740}Sr_{0.375}Li_{0.03}TaO_4$ and $Y_{0.59}SrO_{0.60}Li_{0.03}TaO_4$ in this order.

It is apparent from this figure that the phosphors according to the present invention in which $z=0.03$ and $y=0.075$, $y=0.375$, and $y=0.600$ have especially excellent afterglow characteristics more than the conventional phosphor in which $y=0$, $z=0$.

Figure 6:
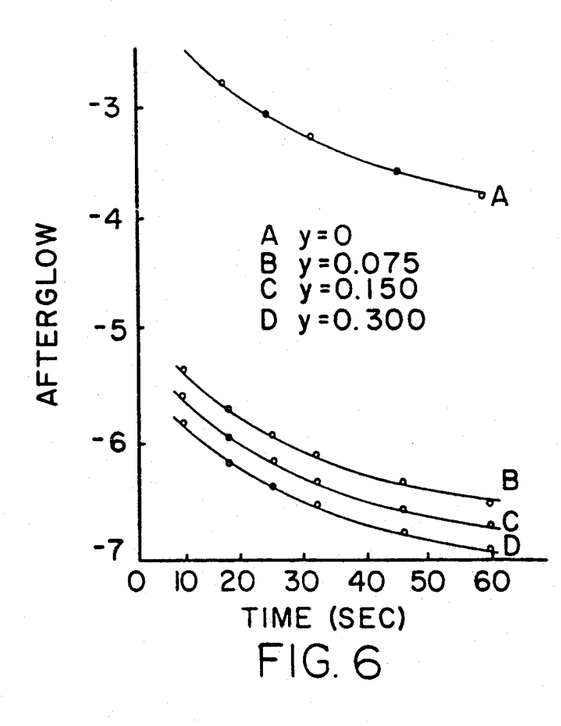

In FIG. 6, the curve B indicates the afterglow characteristic of the phosphor $Ln_{1-x-(\frac{3}{5})y-(\frac{1}{3})z}M''_yM'_zDO_4:xR^{3+}$ in which M'' is Ca, M' being Li, Ln being Y, D being Ta, $z=0.03$, $y=0.075$ and $x=0$, that is, the phosphor $Y_{0.940}Ca_{0.075}Li_{0.03}TaO_4$ which was obtained in Example 10. For the purpose of comparison, the afterglow characteristic of the conventional phosphor in which $y=0$, $z=0$, that is, the phosphor $YTaO_4$ is indicated by the curve A.

It is apparent from FIG. 6 that the phosphor according to the present invention in which $y=0.075$, $z=0.03$ and which was obtained in Example 10 has more excellent afterglow characteristics than that of the conventional phosphor in which $y=0$, $z=0$. Further in FIG. 6, the afterglow characteristics of the phosphors $Ln_{1-x-(\frac{3}{5})y-(\frac{1}{3})z}M''_yM'_zDO_4:xR^{3+}$ in which M'' is Ca, M' being Li, Ln being Y, D being Ta, $x=0$, $z=0.03$ and $y=0.150$ and $y=0.300$, that is, the phosphors $Y_{0.89}Ca_{0.15}Li_{0.03}TaO_4$ and $Y_{0.79}Ca_{0.30}Li_{0.03}TaO_4$ are indicated by the curve C and D in this order. It is apparent from this figure that the phosphors according to the present invention in which $y=0.075$, $y=0.150$ and $y=0.300$ have especially excellent afterglow characteristics than that of the conventional phosphor in which $y=0$ and $z=0$.

Figure 9:
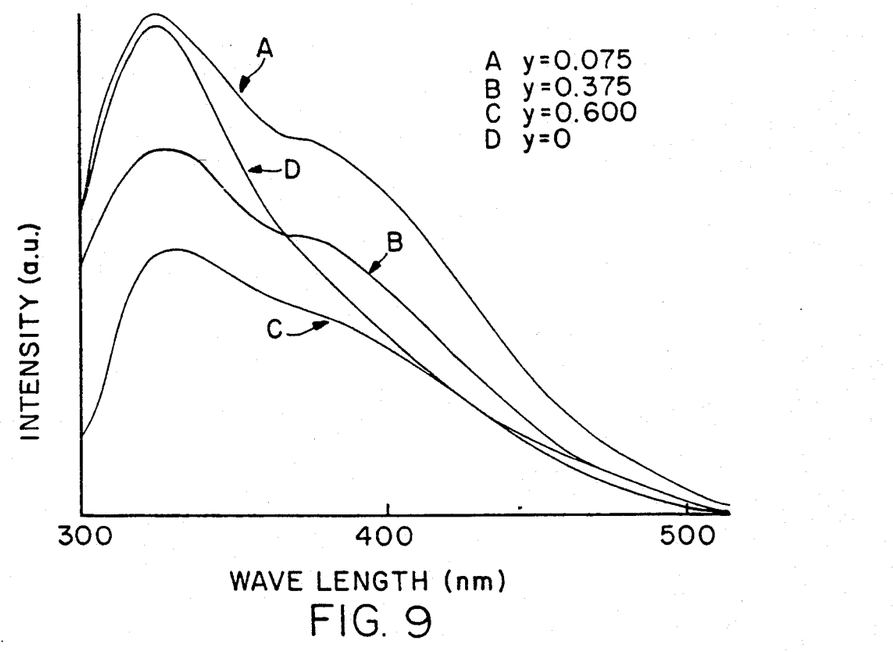
FIGS. 9 to 15 are graphs showing the light emission spectra of the phosphor when the element M" and the value y in the general formula (I) are changed.
Figure 10:
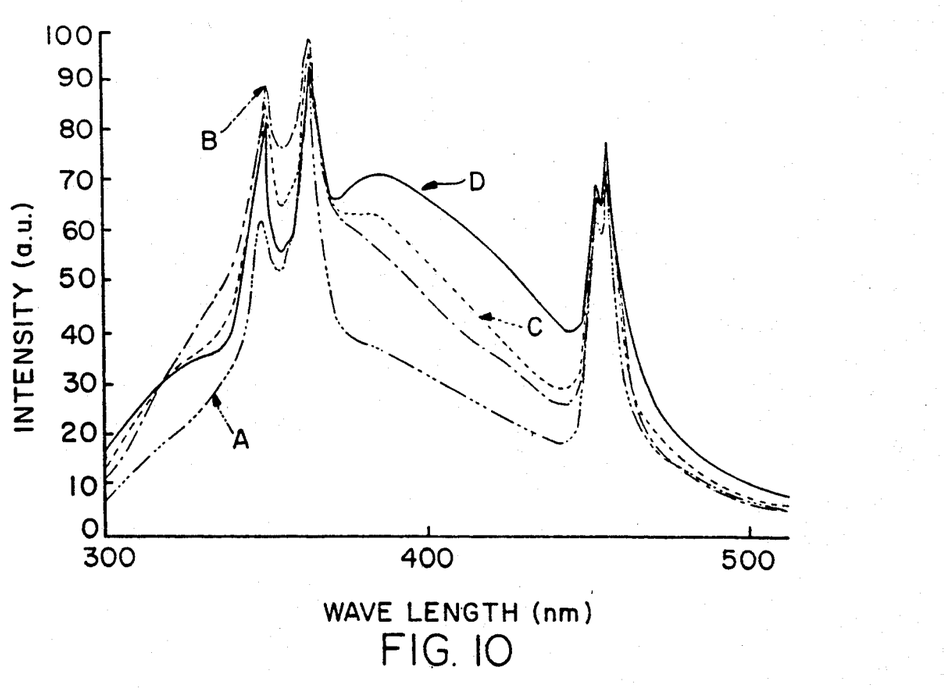

Now, the light emission characteristic of the phosphor $Y_{0.99-x-(\frac{3}{5})y}Sr_yLi_{0.03}TaO_4:xTm^{3+}$ will be described with reference to FIGS. 9 and 10. FIGS. 9 and 10 show the light emission spectrum and the abscissa indicates the light emission wave length (nm unit) while the ordinate indicates the light emission quantity (optional unit).

In FIG. 9, the curves A, B and C indicate the light emission spectra of the phosphors according to the present invention in which $y=0.075$, $y=0.375$ and $y=0.600$ respectively and $x=0$, that is, the phosphors $Y_{0.940}SrO_{0.075}Li_{0.03}TaO_4$ (the curve A), $Y_{0.740}Sr_{0.375}Li_{0.03}TaO_4$ (the curve B) and $Y_{0.59}Sr_{0.60}Li_{0.03}TaO_4$ (the curve C), while the curve D indicates the light emission spectrum of the conventional phosphor $YTaO_4$.

It is apparent from this figure, the phosphors according to the present invention in which $y=0.075$, $y=0.375$ and $y=0.600$ respectively have broader light emission spectra than that of the conventional phosphor in which $y=0$ and have the second light emission peak near 370nm. Especially, the phosphor in which $y=0.075$ and which is indicated by the curve A has much greater light emission quantity than the conventional phosphor containing no strontium.

Further, in FIG.10, the curves A and B indicate the light emission spectra of the conventional phosphor $Y_{0.995}TaO_4:0.005Tm^{3+}$ and phosphor according to the present invention $Y_{0.935}Sr_{0.075}Li_{0.03}TaO_4:0.005Tm^{3+}$ in this order. It is apparent from this figure that in comparison with the conventional phosphor (the curve A), the phosphor according to the present invention (the curve B) not only becomes higher light emission peak near 350nm of $Tm^{3+}$ as an activator but also remarkably increased light emission quantity near 300 nm to 340 nm and 370 nm to 440 nm of the matrix.

Now, the afterglow characteristic and the light emission characteristic of the phosphor $Y_{0.99-x-(\frac{2}{3})y}Cd_yLi_{0.03}TaO_4:xTm^{3+}$ according to the present invention will be described with reference to FIGS. 8, 10 and 11.

Figure 8:
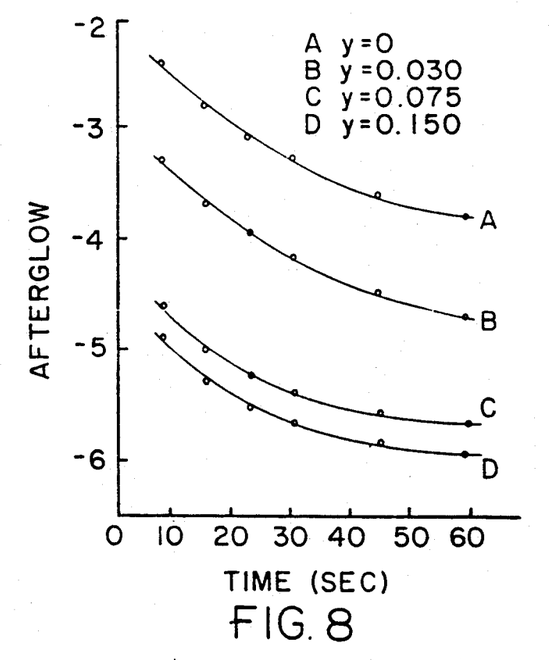

FIG. 8 shows, taking the case of the phosphor $Y_{0.99-(\frac{2}{3})y}Cd_yLi_{0.03}TaO_4$ the influence of the cadmium content (the value y) upon the afterglow characteristic. In this figure, the curves A (the conventional phosphor), B, C and D indicate the afterglow characteristics of the phosphors in which in the abovementioned general formula, y=0, y=0.030, y=0.075 and y=0.150 in this order.

It is apparent from this figure that the afterglow characteristics of the phosphors in which y=0.030, y=0.075 and y=0.150 were remarkably improved in comparison with that of the conventional phosphor.

Figure 11:
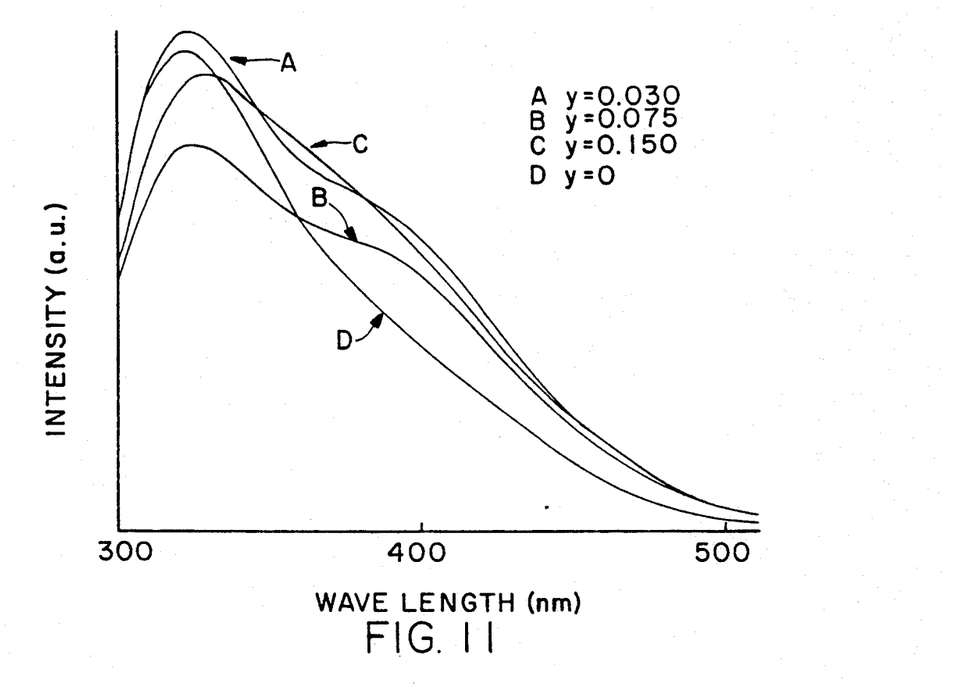
Figure 12:
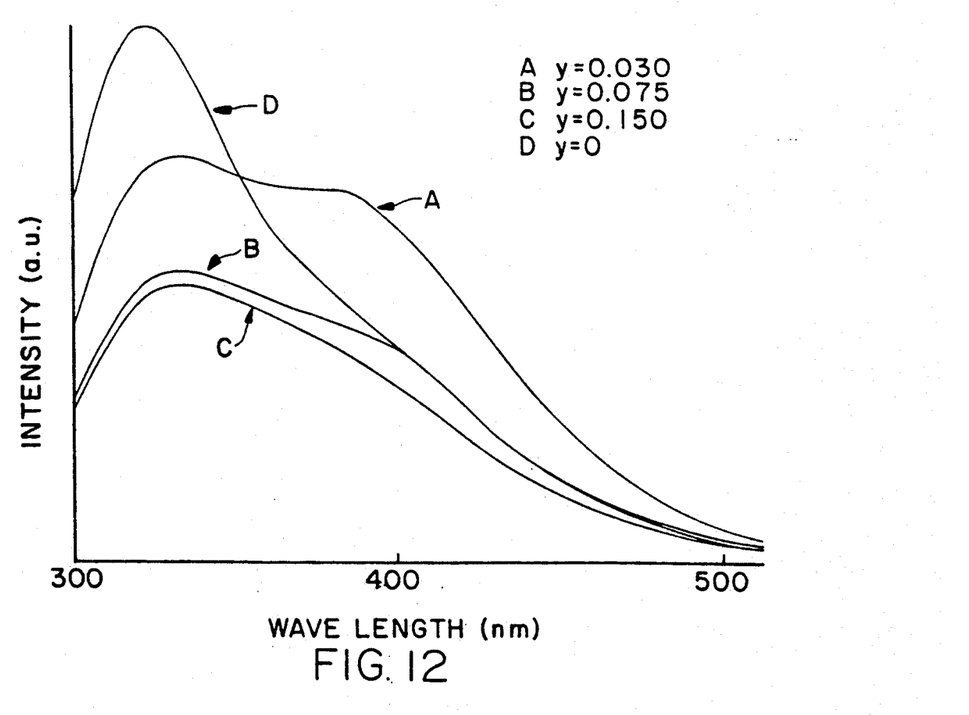
Figure 13:
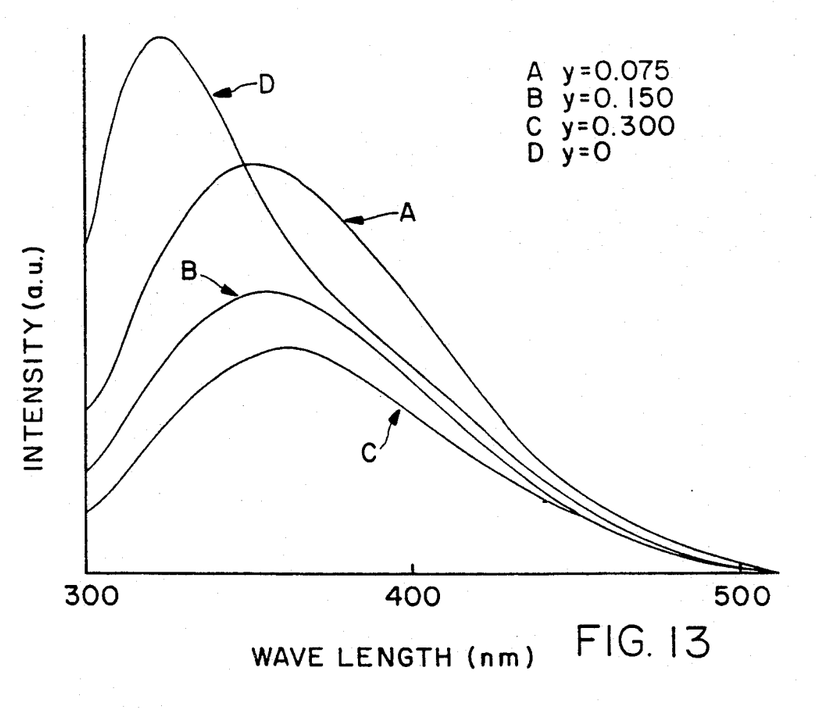
Figure 14:
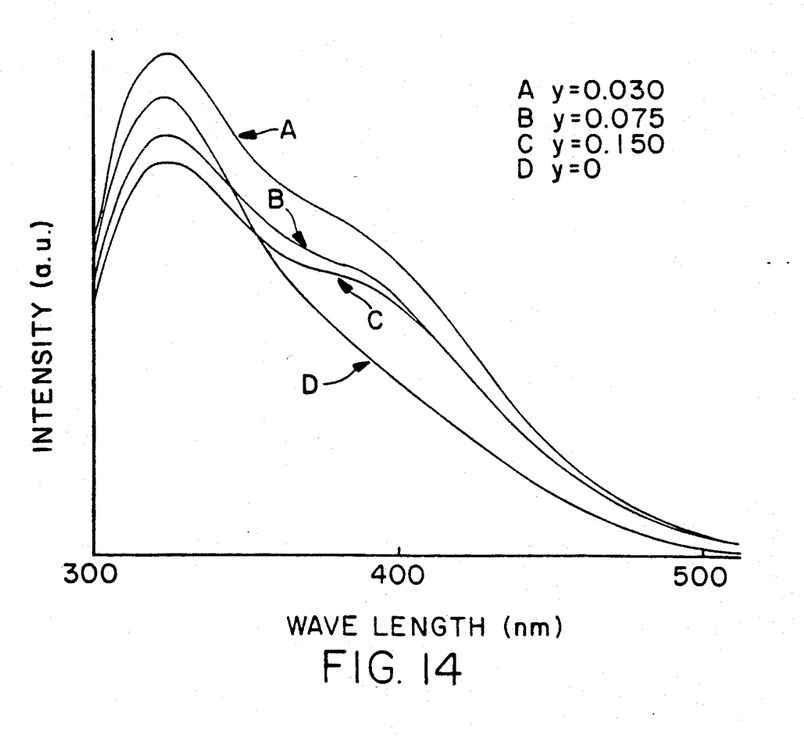
Figure 15:
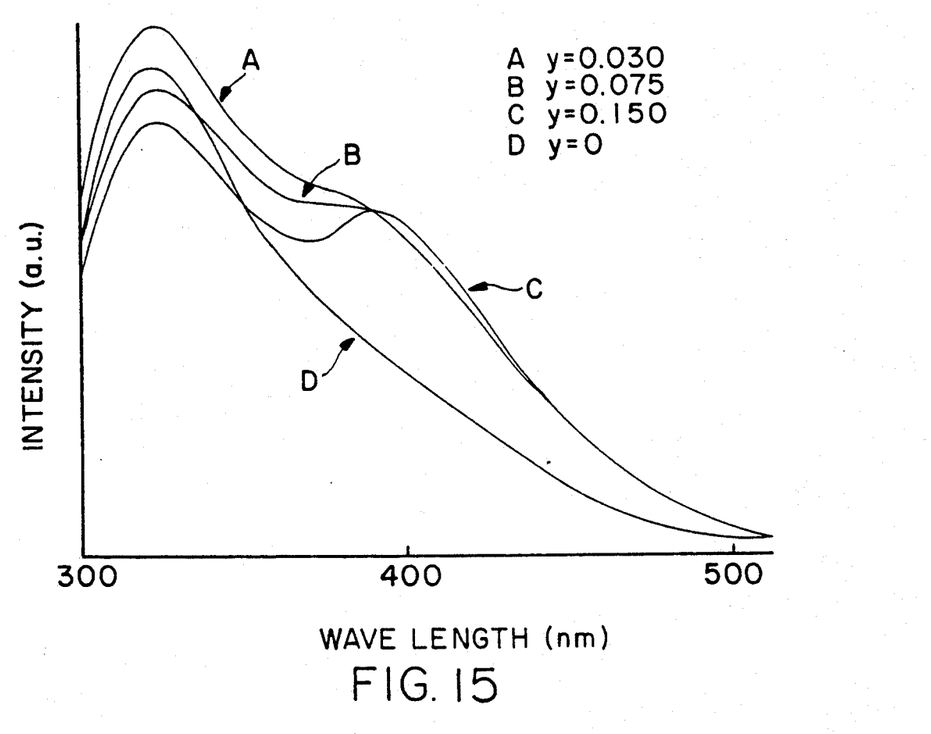

Further it is apparent from FIG. 11, the phosphors $Y_{0.99-(\frac{2}{3})y}Cd_yLi_{0.03}TaO_4$ (the curves A, B and C) have broader light emission spectra than the conventional phosphor $YTaO_4$ (the curve D) and especially the phosphor in which y=0.030 (the curve A) has a remarkably increased light emission quantity. Further, as shown in FIG. 10, in the phosphor according to the present invention (the curve C), both of the activator $Tm^{3+}$ and the matrix have remarkably increased light emission quantities compared with conventional phosphor (the curve D).

Such inclinations shown in FIGS. 6 to 11 are realized when in the general formula (I), M" is Be, Mg, Ca, Ba and Zn, M' is Na, Ba and K, and the afterglow characteristic and the light emission quantity can be improved.

Figure 7:
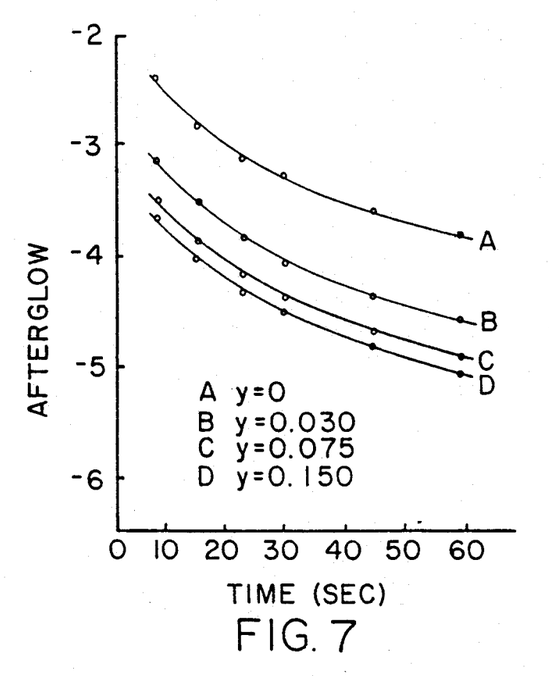

FIG. 7 shows the afterglow characteristic of the phosphor in which in the general formula (I), M" is Ba, M' is Li. As apparently seen from the curves B, C and D, the phosphors according to the present invention showed more excellent afterglow characteristics than the conventional phosphor (the curve A).

Further, in FIGS. 12 to 15 the light emission characteristics of the phosphors according to the present invention in which in the general formula (I), M" is Mg, Ca, Ba, and Zn, M' is Li. As apparently seen from these figures, the phosphors according to the present invention (the curve A, B and C) have broader light emission spectra and much more increased light emission quantities than the conventional phosphor in which y=0 (the curve D).

Figure 16:
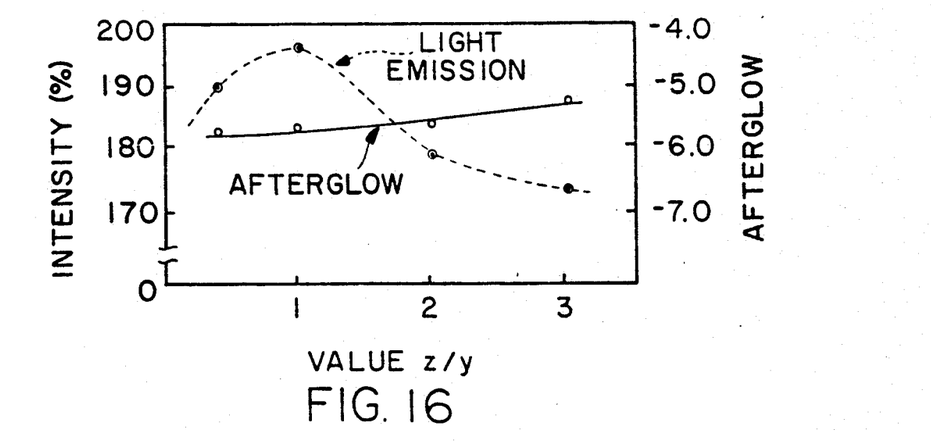
FIGS. 16 to 18 are graphs showing the relative brightness and afterglow characteristics of the phosphor of the present invention against z/y.

The light emission and afterglow (residual luminosity or fluorescence) characteristics for the phosphor $Y_{0.98-}Sr_yLi_zTaO_4$ are shown as a function of the z/y ratio in FIG. 16. The phosphor's z/y ratio is restrained by the equation 2y+z=0.06, and the relative luminously during X-ray stimulation is measured based on a value of 100% for YTaO4. This figure clearly shows that light emission is particulary strong when z/y is in the 0.1 to 2 range, and that the afterglow increases slightly with the z/y ratio.

Figure 17:
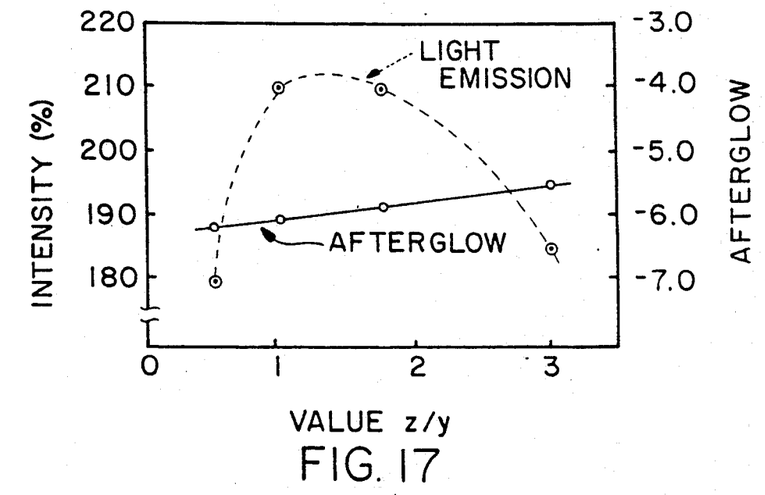
Figure 18:
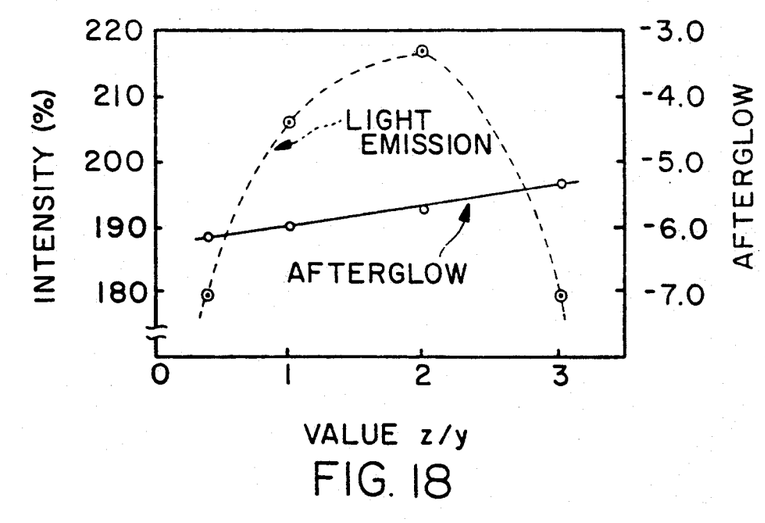

FIGS. 17 and 18 show the light emission and afterglow characteristics of the phosphors $Y_{0.95}Sr_yNa_zTaO_4$ and $Y_{0.90}Sr_yK_zTaO_4$ respectively. These are both based on a luminosity value of 100% for YTaO4, with FIG. 17 restrained by the equation 2y+z=0.15 and FIG. 18 restrained by the equation 2y+z=0.30. As demonstrated in FIG. 16 through FIG. 18, the above phosphors possess exceptional qualities in the z/y range between 0.1 and 3.

Further, as shown in Table 2, the X-ray intensifying screen using the abovementioned phosphor according to the present invention showed an excellent light emission brightness which is 60 to 150% when the light emission brightness of an X-ray intensifying screen using the conventional phosphor $YTaO_4$ is regarded as 100%. The light emission brightness of the X-ray intensifying screen was similar to that of the phosphor powder, and the X-ray intensifying screen in which the phosphor powder having a high light emission brightness was used also showed a high light emission brightness. The afterglow characteristic of the phosphor powder did not change when it was used for the X-ray intensifying screen, and an X-ray intensifying screen having an excellent afterglow characteristic was realized.

Figure 19:
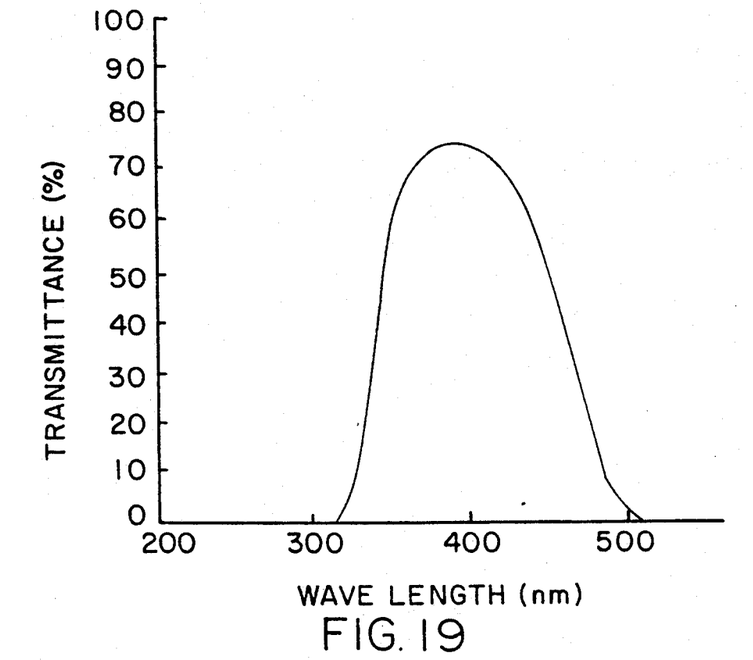
FIG. 19 is a graph showing the characteristic of the filter used in measuring the brightness of the phosphor.
Figure 20:
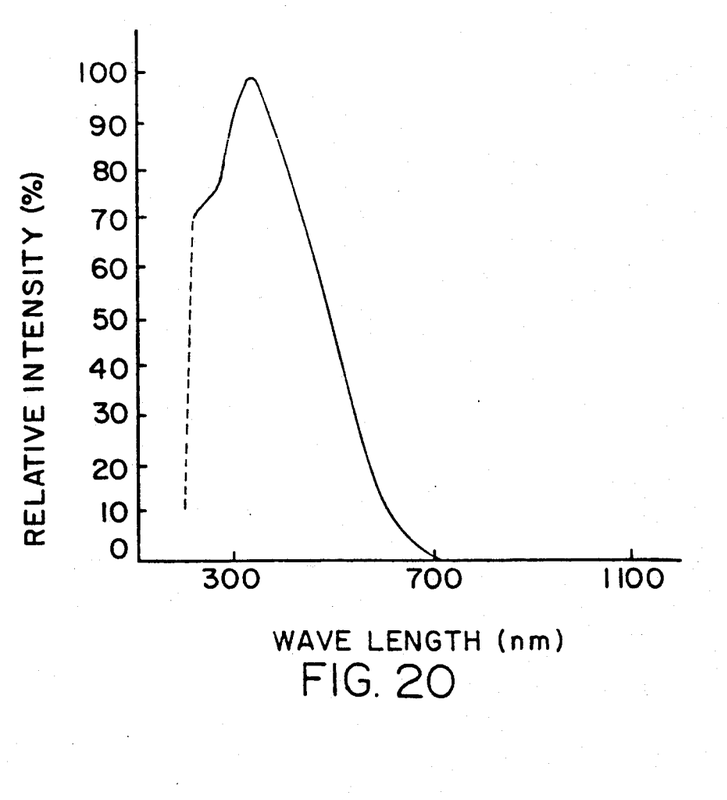
FIG. 20 is a graph showing the sensitivity characteristic of the photomultiplier used in measuring the brightness of the phosphor.

In the measurements of Table 2, the brightness of the phosphor was measured by the steps of irradiating the phosphor with X-ray, passing the light emitted by the phosphor through a filter of the charactristics shown in FIG. 19, and irradiating a photomultiplier with the light so as to exchange the strength of light to an electric current, and then comparing the strengths of the output electric current. In FIG. 20, the sensitivity characteristic of the photomultiplier is shown.

Such inclinations as shown in FIGS. 1 to 8 were also seen when in the general formula (I), M" is Be, Mg, Ca, Sr, Ba, Zn and Cd, M' is Na, Li and K, and the afterglow characteristic and the brightness were improved.

Further, when in the general formula (I), M" is more than two selected from the group of Be, Mg, Ca, Sr, Zn and Cd, M' is Li, Na, Ba and K, similar results appeared.

What is claimed is:

1. An X-ray intensifying screen comprising:
   a support; and
   a phosphor layer supported on said support, said phosphor layer comprising a phosphor which emits light by the excitation of X-rays, having a composition represented by the formula:

$Ln_{1-x-(\frac{2}{3})y-(\frac{1}{3})z}M''_yM'_zDO_4:xR^{3+}$ where: M" is at least one element selected from the group consisting of Ca, Sr and Cd,
   M' is at least one alkali metal selected from the group consisting of Li, Na and K,
   Ln is at least one rare earth element selected from the group consisting of Y, La and Lu,
   D is Ta, or Ta and Nb,
   R is at least one activator metal selected from the group consisting of Tm, Ce, Pr, Sm, Eu, Tb, Dy and Yb,
   y is a value in the range of $1 \times 10^{-5}$ to 1,
   z is a value in the range of $1 \times 10^{-4}$ to 0.1, and
   x is a value in the range of 0 to 0.05,
   said phosphor being obtained by admixing an oxide of Ln in an amount corresponding to $1-x-(\frac{2}{3})y-(\frac{1}{3})z$ parts by mol of Ln, an oxide of D in an amount corresponding to one part by mol of D, an oxide of R in an amount corresponding to x parts by mol of R, a chloride of M' in an amount sufficient to provide z parts by mol of M' and a carbonate of M" in an amount corresponding by y parts by mol of M", the amount of chloride of M' being larger than z parts by mole of M' in said phosphor and
   firing the admixture at a temperature and for a time sufficient to provide said phosphor having said composition and wherein said phosphor exhibits a smaller afterglow and a greater brightness intensity than the same phosphor absent M″ and M′.

2. The X-ray intensifying screen as claimed in claim 1, wherein R is Tm.

3. The X-ray intensifying screen as claimed in claim 1, wherein M″ is Ca, and y is a value in the range $1 \times 10^{-5} \leq y \leq 3 \times 10^{-1}$.

4. The X-ray intensifying screen as claimed in claim 1, wherein M″ is Sr and y is a value in the range $1 \times 10^{-5} \leq y \leq 6 \times 10^{-1}$.

5. The X-ray screen according to claim 1, wherein said M′ is Li.

6. A phosphor which emits light by the excitation of X-rays, having a composition represented by the formula:

$$Ln_{1-x-(\frac{2}{3})y-(\frac{1}{3})z}M''_yM'_zDO_4:xR^{3+}$$

where: M″ is at least one element selected from the group consisting of Ca, Sr and Cd,
M′ is at least one alkali metal selected from the group consisting of Li, Na and K,
Ln is at least one rare earth element selected from the group consisting of Y, La and Lu, D is Ta, or Ta and Nb,
R is at least one activator metal selected from the group consisting of Tm, Ce, Pr, Sm, Eu, Tb, Dy and Yb,
y is a value in the range of $1 \times 10^{-5}$ to 1,
z is a value in the range of $1 \times 10^{-4}$ to 0.1, and
x is a value in the range of 0 to 0.05,
said phosphor being obtained by admixing an oxide of Ln in an amount corresponding to $1-x-(\frac{2}{3})y-(\frac{1}{3})z$ parts by mol of Ln, an oxide of D in an amount corresponding to one part by mol of D, an oxide of R in an amount corresponding to x parts by mol of R, a chloride of M′ in an amount sufficient to provide z parts by mol of M′, and a carbonate of M″ in an amount corresponding by y parts by mol of M″, the amount of chloride of M′ being larger than z parts by mole of M′ in said phosphor and
firing the admixture at a temperature and for a time sufficient to provide said phosphor having said composition and
wherein said phosphor exhibits a smaller afterglow and a greater brightness intensity than the same phosphor absent M″ and M′.

7. The phosphor as claimed in claim 6 wherein R is Tm.

8. An X-ray phosphor as claimed in claim 6 wherein M″ is Ca, and y is a value in the range $1 \times 10^{-5} \leq y \leq 3 \times 10^{-1}$.

9. An X-ray phosphor as claimed in claim 6 wherein M″ is Sr and y is a value in the range $1 \times 10^{-5} \leq y \leq 6 \times 10^{-1}$.

10. The phosphor according to claim 6, wherein said Ln is Y.

11. The phosphor according to claim 6, wherein said M′ is Li.

* * * * *